Figure 1:
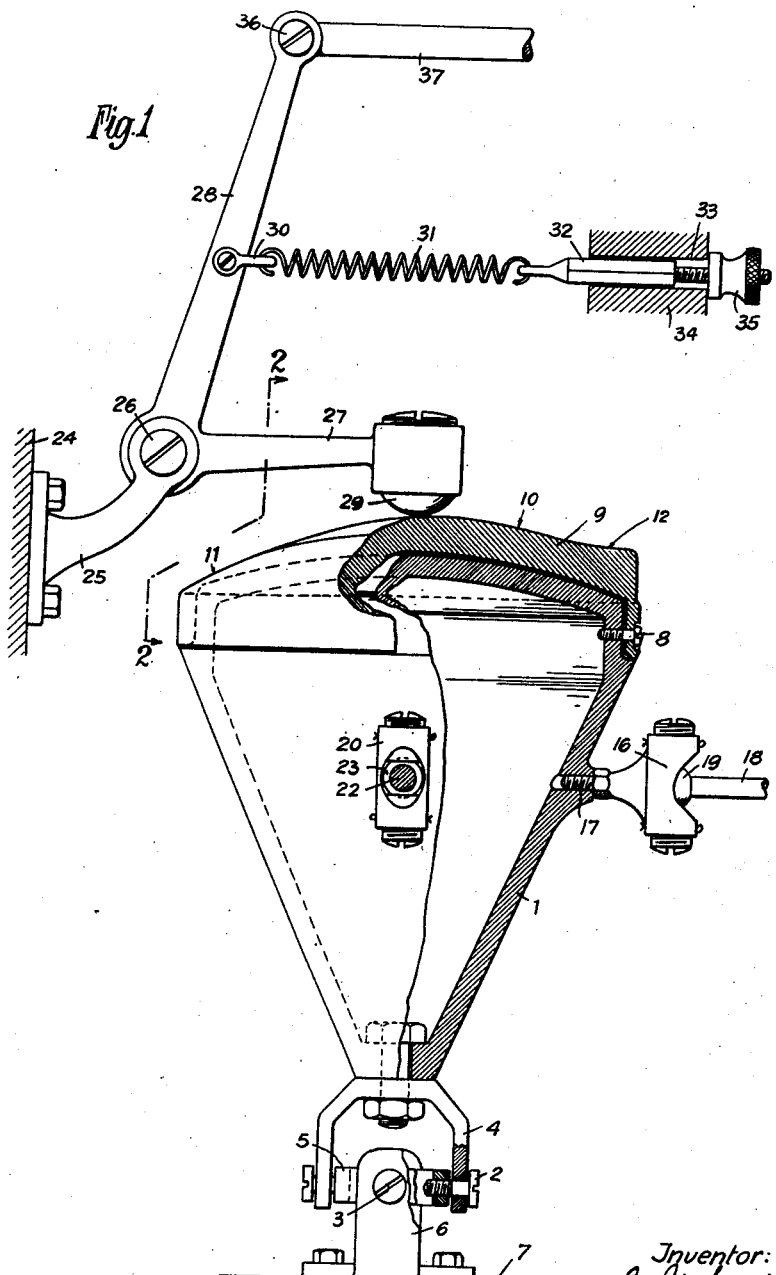

March 19, 1940. A. JIVKOVITCH 2,193,927
STEERING GEAR
Filed Feb. 18, 1937 5 Sheets-Sheet 2

Inventor:
A. Jivkovitch
by
Attorney:

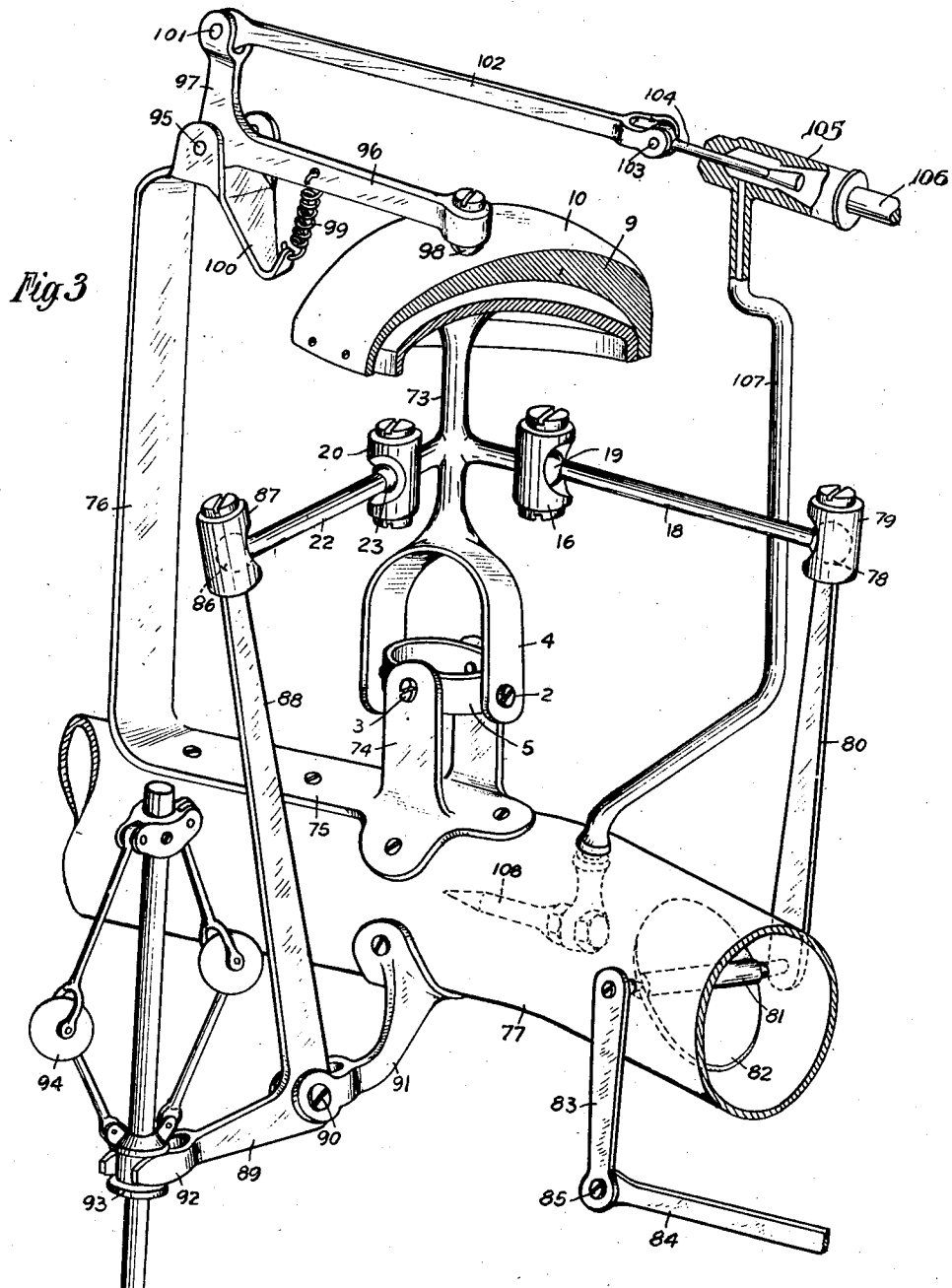

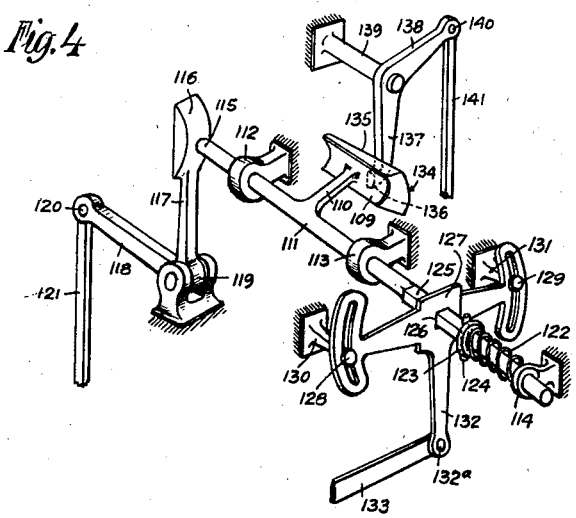
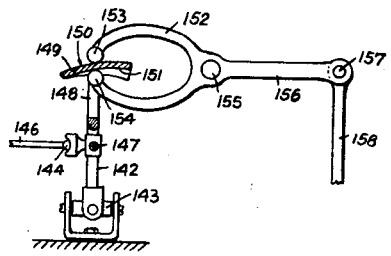
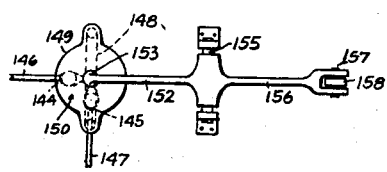
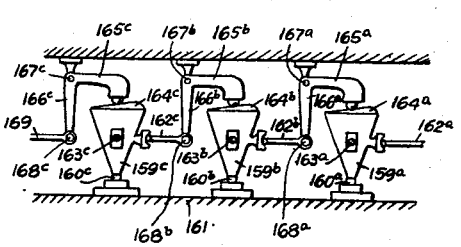

March 19, 1940. A. JIVKOVITCH 2,193,927
STEERING GEAR
Filed Feb. 18, 1937 5 Sheets-Sheet 5
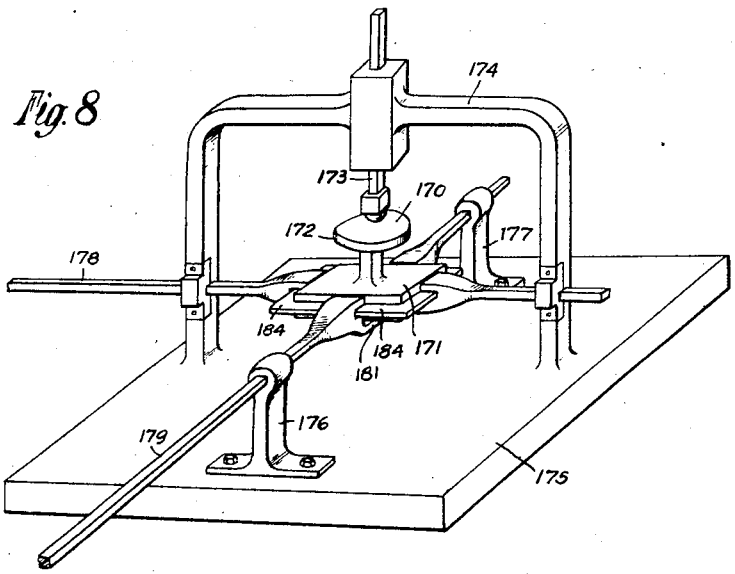
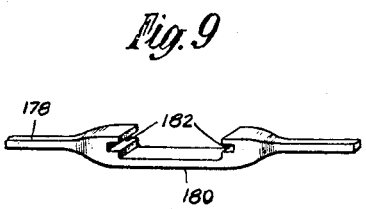
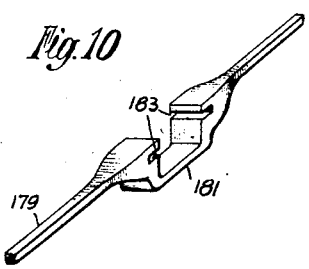
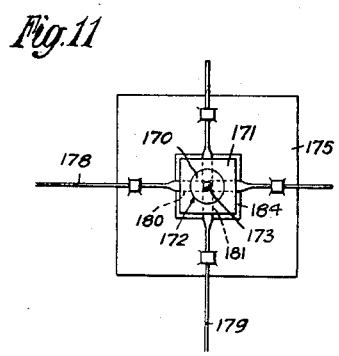
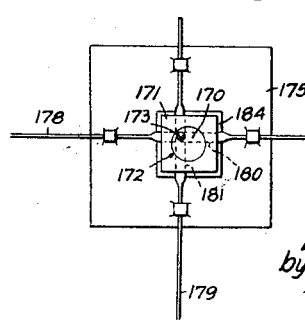

Patented Mar. 19, 1940

2,193,927

UNITED STATES PATENT OFFICE 2,193,927

STEERING GEAR

Alexander Jivkovitch, Beograd, Yugoslavia

Application February 18, 1937, Serial No. 126,508
In Yugoslavia February 28, 1935

7 Claims. (Cl. 123—99)

My invention relates to improvements in steering gears, and the object of the improvements is to provide a gear by means of which resultant movements of at least two variable controlling devices are obtained, and which are simple in construction and reliable in operation. With this object in view my invention consists in providing a gear comprising a member having a curved surface and a body slidable thereon, the said member being controlled by the said controlling devices. Thereby the movement of the said body depends on the resultant of the movements of the aforesaid controlling devices and on the shape of the said curved surface.

The gear may be used in various arts. For example it may be used for controlling the supply of fuel to internal combustion engines, in which case the operation of one of the said controlling devices depends on the number of revolutions of the engine and the operation of the other one on the position of the throttle valve controlling the supply of air to the engine, the said body which is in sliding engagement with the said curved surface controlling the supply of fuel to the engine.

Figure 2:
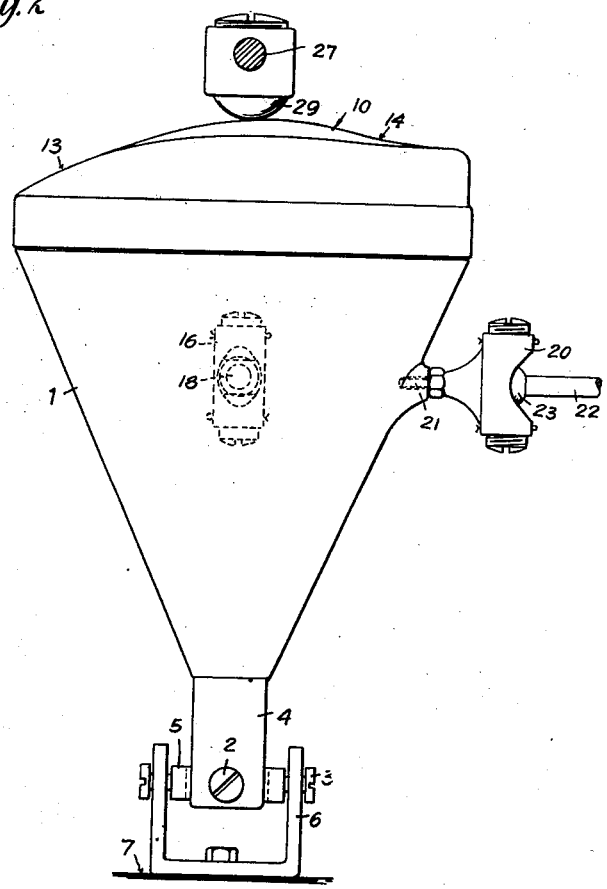

For the purpose of explaining the invention several examples embodying the same have been shown in the accompanying drawings in which the same reference characters have been used in all the views to indicate corresponding parts. In said drawings:

Fig. 1 is an elevation partly in section showing the controlling device,

Fig. 2 is a rear elevation of the gear illustrated in Fig. 1 partly in section taken on the line 2—2 of Fig. 1, Fig. 3 is a somewhat diagrammatical perspective view showing a modification used in connection with a steering mechanism controlling the fuel supply to an internal combustion engine, Fig. 4 is a similar perspective view showing another modification in which rocking and sliding movements may be imparted to the body provided with the curved surface, Figs. 5 and 6 are respectively an elevation and a plan view of another modification in which the member controlled by the gear is adapted to be positively moved in opposite directions by a body provided with two curved surfaces, Fig. 7 is an elevation showing a gear comprising several devices for producing resultant movements, Fig. 8 is a perspective view showing another modification in which the body provided with a curved surface takes the form of a slide adapted to be moved in crossing directions by two other slides, Figs. 9 and 10 are perspective views showing the slides illustrated in Fig. 8, and Figs. 11 and 12 are diagrammatical plan views showing the different positions of the gear illustrated in Fig. 8.

In the construction shown in Figs. 1 and 2, the gear comprises a rocking member 1, which substantially has the form of an obtuse cone having its smaller base face located at its bottom. The said member 1 is mounted by means of a universal joint comprising pivot bolts 2 and 3 and bails 4 and 5 on a bearing block 6 fixed to a base plate 7. To the top part of the rocking member 1, a cap 9 is secured by means of screws 8, the said cap being formed with a curved or convex top face 10, which is shaped as follows: From the part 11 located at the left hand end of Fig. 1 the radii of curvature of the curved surface 10, which begin from the axis of the pivot bolts 3, are gradually increased to the right hand part 12 of the said surface, and in a similar way beginning with the part 13 located at the left hand side of Fig. 2 the radii of curvature of the curved surface 10 which begin from the axis of the pivot bolts 2 are gradually increased to the right hand part 14. Otherwise the shape of the convex surface 10 depends on the function to be imparted to the body or operation to be controlled.

To the median part of the rocking member 1 a block 16 formed with a spherical socket is fixed by means of a pin 17, the axis of which is located in the same plane as the axis of the pivot bolts 2 of the universal joint. The said socket is engaged by the spherical head 19 of a steering rod 18. In a similar way to the median part of the rocking member 1 a block 20 having a spherical socket is fixed by means of a pin 21, the axis of which is located in the same plane as the axis of pivot bolts 3 of the said universal joint, as is shown in Fig. 2. The bloc 20 is engaged by the spherical head 23 of a steering rod 22. Thus by reciprocating movement of the steering rod 18 the rocking member 1 is rocked about the pivot bolts 3, and by the reciprocating movement of the steering rod 22 it is rocked about the pivot bolts 2.

To a stationary part 24 a bracket 25 is fixed which has a bell crank lever 27, 28 mounted on a pivot bolt 26. The arm 27 of the said bell crank lever carries a head 29 having a spherical surface, and the arm 28 is connected by means of an eye 30 to one end of a spring 31, the opposite end of which is attached to a bolt 32 having a square cross-section. The said bolt 32 is shiftable in a hole 33 of a fixed block 34, which hole is likewise square in cross-section, and the bolt is adapted to be set into position within the hole 33 by means of a set screw 35 for varying the tension of spring 31, the said screw nut tending to hold the head 29 of the arm 27 in engagement with the curved surface 10 of the rocking member 1.

To a pivot bolt 36 carried by the free end of the arm 28 a rod 37 is jointed which is connected with the member to be controlled by the gear.

It is not necessary to arrange the steering rods 18 and 22 exactly at right angles, but they must be displaced relatively to each other at an angle of less than 180°.

The operation of the gear is as follows:

When the rocking member 1 is rocked by means of the steering rods 18 and 22 the curved face 10 slides relatively to the head 29. If, for example, the rod 18 is shifted to the left in Fig. 1, the rocking member 1 is rocked about the pivot bolts 3 into a position in which a higher portion of the curved face 10 engages the head 29. Therefore the head 29 is moved upwardly, and the bell crank lever 27, 28 is rocked anticlockwise, so that the driven rod 37 is shifted to the left in Fig. 1. According as the steering rod 18 is shifted a greater or smaller length, also the bell crank lever 27, 28 is rocked more or less in accordance with the shape of the surface 10. In a similar way the head 29 is moved when the steering rod 22 is shifted, for example, to the left in Fig. 2, thus rocking the rocking member 1 about the pivot bolts 2. The bell crank lever 27, 28 is rocked anticlockwise in the manner just described, at a greater or smaller angle, according as the steering rod 22 is moved through a greater or smaller angle, the rocking movement of the bell crank lever also depending on the shape of the curved surface 10. The driven rod 37 is shifted accordingly by the bell crank lever 27, 28.

When both steering rods 18, 22 are moved in one or the other direction a resultant rocking movement is imparted to the rocking member 1 and the said resultant movement is transmitted through the intermediary of the bell crank lever 27, 28 to the driven rod 37. Therefore the driven rod 37 is controlled in dependence of the resultant of the movements of the steering rods 18, 22 and also in dependence of the shape of the curved face 10 of the rocking member 1, the said rocking member 1 providing a controlling device intermediate the steering rods 18, 22 and the driven rod 37.

The construction and arrangement of the steering rods, the driven rod, the rocking member, and the curved face may be varied in different ways without departing from the scope of the invention.

Where it is necessary to combine the resultant values from more than two controlling members a plurality of the gears described above may be coupled with one another, for example, by connecting the arm 28 of the bell crank lever with the steering rod 18 or 22 of the next gear.

The movement resulting from the operation of the aforesaid devices may also be affected by shifting the bearing block 6, or the bracket, or the bearing 6 and the bracket 25.

The universal joint 2 to 5 may cooperate with a second rocking member similar to the first named rocking member 1, the said steering rods 18 and 22 acting on a plurality of curved surfaces and a plurality of mechanical members cooperating with the said faces. Thus this modification comprises a gear equipped at least with two curved faces. In the construction of the gear shown in Fig. 1 the steering rods 18, 22 may be connected with controlling members of apparatus used in various arts, while the driven rod 37 is connected with the controlled device of the said apparatus. Thus for example measuring instruments, calculating apparatus, apparatus for supplying fuel to internal combustion engines and the like, which must be set in accordance with a plurality of variable factors, may be set by means of the aforesaid devices. Further the said apparatus may be used, for example, in the broadcasting art for controlling a circuit in accordance with a variable capacity and a variable self-induction. The resulting effect of this setting operation may be used by means of additional devices for affecting another value, or it may be transmitted to another device.

In Fig. 3 I have shown the manner of controlling the supply of fuel to an internal combustion engine by means of a device of the construction shown herein.

The gear comprises a rocking member of the type described above. In the construction shown in the figure the said rocking member takes the form of a rod 73 which carries at its top end the head 9 formed with the curved surface 10, and which is mounted at its bottom end by means of the universal joint 2 to 5 on a bearing 74 carried by an arm 75 of an angular bracket 75, 76. The arm 75 is screwed to a pipe 77 forming a part of an internal combustion engine supplying air thereto. The steering rods 18, 22 are displaced with relation to each other at an angle of 90°, and they are connected with the rocking rod 73 by means of the universal joints 16, 19 and 20, 23. The steering rod 18 is connected by means of a spherical head 78 with a bearing block 79 having a spherical socket and carried by the top end of a lever 80. The said lever 80 is fixed to a shaft 81 which extends through the pipe 77 and has a throttle valve 82 fixed thereto. To the opposite end of the shaft 81 an arm 83 is fixed which is jointed at 85 with the usual control rod 84.

The other steering rod 22 is connected by a spherical head 86 with a bearing 87 having a spherical socket and carried by the top end of an arm 88 of a bell crank lever 88, 89. The said bell crank lever is rockingly mounted on a pivot bolt 90 carried by a bracket 91 screwed to the pipe 77. The arm 89 is bifurcated at its end 92, and the said bifurcated end engages a circumferential groove of a collar 93 adapted to be shifted by means of the centrifugal governor 94 of the internal combustion engine.

On a pivot bolt 95 carried by the arm 76 of the bracket 75, 76 a bell crank lever 96, 97 is mounted the arm 96 of which carries a spherical head 98 and is connected by a spring 99 with a downwardly directed portion 100 of the arm 76 the said spring tending to press the head 98 on the curved surface 10. The arm 97 of the bell crank lever is connected by means of a pivot bolt 101 with a link 102 jointed to a pivot bolt 103 carried by the usual needle valve 104 passed into the casing 105 of the fuel valve and controlling the supply of fuel to the engine. The said casing is connected with the fuel supply 106 and with a pipe 107 communicating through the pipe 77 with the fuel atomizer 108.

The operation of the gear shown in Fig. 3 is as follows:

When the throttle valve 82 is set, the rocking member 73 is rocked through the intermediary of the lever 80 and the steering rod 18, so that the curved surface 10 rocks the bell crank lever 96, 97 and thus sets the fuel valve 104 through the intermediary of the link 102. In a similar way upon a change of the velocity of the engine the bell crank lever 88, 89 is turned in accordance with the position of the governor 94, and the said displacement of the bell crank lever is transmitted through the steering rod 22 to the rocking member 73, so that the fuel valve 104 is likewise set through the intermediary of the curved surface 10. Thus to each combination of the positions of the throttle valve 82 and the governor 94 there corresponds not only the amount of the air drawn in by the engine, but also the amount of fuel supplied through the fuel valve 104, which amount depends on the shape of the curved surface 10.

In lieu of the governor 94 controlling the steering rod 22 any other suitable controlling device may be provided, for example an electromechanical or hydraulic controlling device.

The gear described with reference to Fig. 3 may be used in connection with devices for immediately injecting fuel into the cylinder of the engine, or in connection with a carburetter, and in both cases various modifications of the gear may be provided, by means of which the fuel is supplied either directly or under constant or variable pressure, either by pneumatic, hydraulic, or mechanical means. Where the fuel is directly injected by means of a pump the gear controls the said pump, and where the fuel is supplied under constant pressure the gear controls a device for opening and closing the fuel nozzle more or less, or for retarding the supply of fuel, for example by means of a reducing valve. Where the supply of fuel is effected under varying pressure the gear is constructed for controlling the said pressure. Further, combined constructions may be provided, for example for simultaneously varying the pressure of the fuel and the opening of the fuel nozzle. The gear may also be used in connection with fuel regulating devices of the type in which the fuel is atomized by means of compressed air, steam, or exhaust gas.

In the construction shown in Figs. 1 and 2 a body having a curved controlling surface is adapted to be rocked in two directions by means of the steering devices 18, 22 acting at right angles. In Fig. 4 I have shown a modification in which one of the movements of the said member is rectilinear.

As shown in the said figure, the said gear comprises a rocking member 109 which is mounted by means of an arm 110 on a shaft 111 having rotary and axial movement in stationary bearings 112, 113, and 114. At its left hand end the said shaft is round, and it is engaged by a curved surface 116 formed on an arm 117 of a bell crank lever 117, 118 which is pivotally mounted on a stationary bearing 119. The arm 118 is connected by a pivot bolt 120 with a steering rod 121. Near its right hand end the shaft 111 carries a coiled spring 122 which bears with one end on the bearing 114 and with its opposite end on a disk 123, the said disk being pressed by the spring on a pin 124 fixed to the shaft 111. Further, the shaft has a portion 125 which is square in cross-section, and which is shiftable in a square hole 126 of a rockingly mounted member 127 guided in stationary bearings 130, 131 by means of pins and slots 128, 129. An arm 132 of the rocking member 127 is jointed at 132a to a second steering rod 133.

The rocking member 109 is formed with a curved surface 134 the radius of curvature of which is gradually increased in the direction of the circumference and from the top part of the surface downwardly. Further, the surface 134 tapers inwardly in the form of a wedge 135 from its right hand end towards its left hand end, the said tapering portion being conical or curved. In the construction shown in Fig. 4 the thickness of the wedge shaped portion 135 is increased from the left to the right. The surface 134 is engaged by a laterally bent head 136 of an arm 137 forming a part of a bell crank lever 137, 138 mounted on a stationary bearing 139. The arm 138 of the said bell crank lever is jointed at 140 with the member to be controlled.

The operation of the gear shown in Fig. 4 is as follows:

When the steering rod 121 is moved downwardly the bell crank lever 117, 118 is moved anticlockwise, so that the curved surface 116 of the arm 117 is moved away from the bearing 112, and the shaft 111 is shifted by the spring 122 to the left and upwardly, the square portion 125 of the shaft 111 sliding within the square hole 126 of the rocking member 127. By the said displacement of the shaft 111 the rocking member 109 is shifted in such a way that the bell crank lever 137, 138 is rocked by the wedge shaped portion 135 in anticlockwise direction and the controlled member 141 is moved upwardly.

When the steering rod 133 is shifted to the right in Fig. 4 the rocking member 127 is rocked anticlockwise. The square portion 125 is carried along by the said rocking member, so that the shaft 111 is turned in a corresponding direction and the rocking member 109 is moved upwardly. Thereby the curved surface 134 turns the bell crank lever 137, 138 so that the controlled member 141 is moved upwardly. Thus in this case by the combined sliding and rocking movements of the member 109 the driven member 141 is displaced in dependence of the movements of the driving steering rods 121, 133.

The modification shown in Figs. 5 and 6 is similar in construction to the example illustrated in Figs. 1 and 2, but the driven member is positively shifted in both directions. The rocking member 142 shown in Fig. 5 is mounted on the base by means of a universal joint 143. Substantially to the middle of the rocking member 142 steering rods 146 and 147 are connected by means of universal joints 144 and 145, the said rods being disposed relatively to each other at right angles. The top part 148 of the rocking member 142 is bifurcated and it carries a curved head 149. The upper curved surface 150 of the said head corresponds to the curved face 10 of the cap 9 shown in Fig. 1. The bottom face 151 of the head 149 is likewise curved, and it is shaped similarly to the curved surface 150.

The curved head 149 is embraced by a bifurcated arm 152 formed with spherical heads 153 and 154, and it is free to rock in any direction between the said heads 153 and 154. The bifurcated arm 152 is pivotally mounted on a pivot bolt 155, and it is made integral with an arm 156 to which a driven rod 158 is jointed at 157.

The operation of the gear shown in Figs. 5 and 6 is substantially the same as that described with reference to Figs. 1 and 2. To the head 149 resultant movement is imparted which is composed of the individual movements of the steering rods 146 and 147. By the curved surfaces 150 and 151 of the head 149 the bifurcated arm 152 is pivotally rocked in one or the other direction, so that also the driven member 158 is positively moved upwardly or downwardly.

In Fig. 7 I have shown a modification in which a plurality of controlling gears cooperate with one another. The said gear comprises rocking members 159a, 159b, 159c of a construction similar to the one illustrated in Figs. 1 and 2, the said members being mounted with their bottom ends through the intermediary of universal joints 160a, 160b, 160c on a foundation 161. To the rocking members steering rods 162a, 162b, 162c and 163a, 163b, 163c are jointed which are displaced with relation in each rocking member at an angle of 90°. The upper curved surfaces 164a, 164b, 164c of the rocking members act on bell crank levers 165a, 165b, 165c which are pivotally mount at 167a, 167b, 167c. Arms 166a and 166b are connected at 168a, 168b with the links 162b and 162c respectively. The arm 166c is connected with a driven member 169. Thus the movement composed of the individual movements of the steering rods 162a, 162b, 162c is transmitted to the driven member 169. For example, the movement of the steering rod 162a is transmitted through the rocking member 159a, the bell crank lever 165a, 166a, the steering rod 162b, the rocking member 169b, the bell crank lever 165b, 166b, the steering rod 162c, the rocking member 159c, and the bell crank lever 165c, 166c to the driven member 169. In a similar way the movements of the other steering rods 163a, 163b, 163c are transmitted to the same steering rod 169.

In Figs. 8 and 9 I have shown a modification in which a member 171 in the form of a slide is provided in lieu of the rocking member 1 shown in Figs. 1 and 2, the said member 171 being formed with a convex or otherwise curved surface 170. The slide 171 takes the form of a rectangular plate carrying at its top a head 172 on which the said convex or otherwise curved surface 170 is formed. The said curved surface 170 acts on a driven or controlled rod 173 which is vertically shiftable in a bail 174 rising from a base plate 175. On the said base plate bearings 176, 177 are mounted.

In the vertical arms of the bail 174 a steering slide 178 is horizontally shiftable, and in the bearings 176, 177 a second steering slide 179 is horizontally shiftable, the said slides being arranged crosswise and preferably at angles of 90°. The slides have the same function as the steering rods 18 and 22 shown in Fig. 1. They are formed with recessed portions 180 and 181 respectively which embrace the slide 171, and in the said cranked portions grooves 182 and 183 are provided which engage flanges 184 of the plate 171.

The operation of the gear shown in Figs. 8 to 10 will be readily understood from an inspection of Figs. 11 and 12. Fig. 11 shows the median position of the plate 171. When the steering slide 178 is shifted to the right and the steering slide 179 downwardly and to the left, as seen in Fig. 11, the plate 171 carrying the head 172 and the curved surface 170 is shifted into the position shown in Fig. 12. Thus, in a similar way as has been described with reference to Figs. 1 and 2, movement is imparted to the controlled member 173 which is a resultant of the movements imparted to the steering slides 178 and 179.

I claim:

1. A fuel governing device for an internal combustion engine, comprising a supply of air for supporting combustion, a supply of fuel, a gear comprising at least one interceding device having a curved surface of double curvature and adapted to be operated by at least two devices, for controlling the fuel supply, said interceding device being operatively connected with said fuel supply.

2. A fuel governing device for an internal combustion engine, comprising a supply of air for supporting combustion, a supply of fuel, a gear controlling said fuel supply and comprising a body having a curved surface of double curvature, a member in sliding engagement therewith and moved thereby and operatively connected with said fuel supply, a speed control member for said body, and a second control member for said body controlled by the air supply, said control members acting at an angle to one another for moving said body.

3. A fuel governing device for an internal combustion engine as claimed in claim 2 comprising in addition a centrifugal governor acting on said first named control member, and said member controlled by the air supply is operatively connected with a throttle valve controlling said air supply, and in which the member in sliding engagement with said body is operatively connected with a member controlling the fuel supply.

4. A fuel governing device for an internal combustion engine, comprising a supply of fuel, a gear controlling said fuel supply and comprising a rockingly mounted member formed with a curved surface of double curvature, a member in sliding engagement with said surface to be moved thereby, and control members acting at an angle to one another for moving said first mentioned member.

5. A fuel governing device for an internal combustion engine, comprising a supply of fuel, a control gear, comprising a body having a curved surface, a bearing for said body permitting pivotal and axial movement thereof, control members acting on said body for rocking and axially moving the same, said curved surface being substantially conical in shape and curved about the pivotal axis of said body with varying radii of curvature, and a member engaging said curved surface to be moved thereby to control the fuel supply.

6. A fuel governing device for an internal combustion engine, comprising a supply of fuel, a control gear, comprising a body having two curved surfaces, a bifurcated member straddling said body and engaging said sufaces, and control members for said body acting at an angle to one another for moving said body whereby the said member is moved to control the fuel supply.

7. A fuel governing device for an internal combustion engine, comprising a supply of fuel, a member controlling said supply, means to control said member, several interceding devices operatively located in series between said member and said control means, each of said interceding devices having a surface of double curvature adapted to engage the interceding device next in series in such a manner that the movement caused by one interceding device is transferred to the interceding device following.

ALEXANDER JIVKOVITCH.